United States Patent
Yerli et al.

(10) Patent No.: US 12,358,388 B2
(45) Date of Patent: Jul. 15, 2025

(54) PLUG-IN MODULE FOR WIRELESS CHARGING

(71) Applicant: VETUREX INC, Dubai (AE)

(72) Inventors: Faruk Yerli, Frankfurt am Main (DE); Cengiz Hakan Kutluhan, Erlangen (DE)

(73) Assignee: VETUREX INC, Dubai (AE)

(*) Notice: Subject to any disclaimer, the term of this patent is extended or adjusted under 35 U.S.C. 154(b) by 0 days.

(21) Appl. No.: 18/002,326

(22) PCT Filed: Apr. 1, 2021

(86) PCT No.: PCT/EP2021/058702
§ 371 (c)(1),
(2) Date: Dec. 19, 2022

(87) PCT Pub. No.: WO2022/207116
PCT Pub. Date: Oct. 6, 2022

(65) Prior Publication Data
US 2023/0211684 A1 Jul. 6, 2023

(51) Int. Cl.
*B60L 53/38* (2019.01)
*B60L 53/12* (2019.01)
(Continued)

(52) U.S. Cl.
CPC ............... *B60L 53/38* (2019.02); *B60L 53/12* (2019.02); *B60L 53/34* (2019.02); *H02J 7/0013* (2013.01);
(Continued)

(58) Field of Classification Search
CPC .......... H02J 50/005; H02J 50/12; H02J 50/20; H02J 50/90; B60L 53/12; B60L 53/16; B60L 53/34; B60L 53/38
See application file for complete search history.

(56) References Cited

U.S. PATENT DOCUMENTS 8,975,864 B2    3/2015  Kim
9,463,707 B2   10/2016  Lewis
(Continued)

FOREIGN PATENT DOCUMENTS

EP    3386070 A1 *  10/2018
EP    3393008 A2    10/2018
(Continued)

OTHER PUBLICATIONS

International Search Report and Written Opinion mailed Dec. 8, 2021, for priority International Patent Application No. PCT/EP2021/058702.

*Primary Examiner* — Rexford N Barnie
*Assistant Examiner* — Rasem Mourad
(74) *Attorney, Agent, or Firm* — Renner, Otto, Boisselle & Sklar, LLP

(57) ABSTRACT

The invention refers to a plug-in module for charging of batteries in an electronic device, comprising a pad-element configured to receive wireless input of electromagnetic energy; a chassis connected with the pad-element and provided with a plug connector which is configured to be plugged in a charging socket of the electronic device wherein the chassis comprises integrated energy transmission channels and a circuit board configured to transfer and convert the electromagnetic energy from the pad-element into a charging current provided at the plug connector.

13 Claims, 10 Drawing Sheets

(51) Int. Cl.
  *B60L 53/34* (2019.01)
  *H02J 7/00* (2006.01)
  *H02J 7/34* (2006.01)
  *H02J 50/00* (2016.01)
  *H02J 50/20* (2016.01)
  *H02J 50/40* (2016.01)
  *H02M 3/158* (2006.01)
  *H02M 7/5387* (2007.01)

(52) U.S. Cl.
  CPC ............ *H02J 7/342* (2020.01); *H02J 50/005* (2020.01); *H02J 50/20* (2016.02); *H02J 50/402* (2020.01); *H02J 2300/24* (2020.01); *H02M 3/1582* (2013.01); *H02M 7/5387* (2013.01)

(56) References Cited

U.S. PATENT DOCUMENTS

| | | |
|---|---|---|
| 9,505,314 B2 | 11/2016 | Widmer |
| 9,630,516 B2 | 4/2017 | Enomoto |
| 9,931,952 B2 | 4/2018 | Tripathi |
| 10,177,593 B2 | 1/2019 | Turner |
| 10,293,700 B2 | 5/2019 | Javaid |
| 10,457,158 B2 | 10/2019 | Namou |
| 10,622,826 B2 | 4/2020 | Cong |
| 10,668,819 B2 | 6/2020 | Sham |
| 10,814,729 B2 | 10/2020 | Richard |
| 11,058,326 B1* | 7/2021 | Filipobic .............. A61B 5/6831 |
| 11,124,079 B2 | 9/2021 | Rodriguez Romero |
| 11,130,418 B2 | 9/2021 | Lewis |
| 11,161,426 B2 | 11/2021 | Park |
| 11,220,191 B2 | 1/2022 | Kinomura |
| 11,312,251 B2 | 4/2022 | Li |
| 11,427,101 B2 | 8/2022 | Penilla |
| 11,452,028 B2 | 9/2022 | Bittner |
| 2004/0130915 A1* | 7/2004 | Baarman .................. H02J 50/40 363/21.02 |
| 2007/0072474 A1* | 3/2007 | Beasley .................. H02J 50/40 439/332 |
| 2011/0241437 A1* | 10/2011 | Kanno .................... H01F 38/14 307/104 |
| 2011/0254503 A1* | 10/2011 | Widmer .................. B60L 53/12 320/108 |
| 2014/0232331 A1 | 8/2014 | Stamenic |
| 2015/0002088 A1* | 1/2015 | D'Agostino ............ H02J 50/10 320/108 |
| 2016/0075249 A1 | 3/2016 | Grabar |
| 2016/0264007 A1 | 9/2016 | Haase |
| 2017/0012459 A1* | 1/2017 | Takatsu .................. B60L 53/18 |
| 2017/0197517 A1 | 7/2017 | Jamieson |
| 2020/0055415 A1 | 2/2020 | Littrell |
| 2020/0193533 A1 | 6/2020 | Lee |
| 2022/0063426 A1 | 3/2022 | Chatziioannou |
| 2022/0069638 A1 | 3/2022 | Zeng |
| 2022/0281343 A1 | 9/2022 | Yang |

FOREIGN PATENT DOCUMENTS

| | | |
|---|---|---|
| JP | 2012244844 A | 12/2012 |
| JP | 2014155279 A | 8/2014 |
| WO | 2019038265 A1 | 2/2019 |

* cited by examiner

PLUG-IN MODULE FOR WIRELESS CHARGING

This application is a national phase of International Patent Application No. PCT/EP2021/058702 filed Apr. 1, 2021, which is hereby incorporated herein by reference in its entirety.

TECHNICAL FIELD

The present invention refers to the technical field of wireless charging and in particular it provides a plug-in module for charging of batteries in an electronic device. While the invention is designed around the charging of Electric Vehicles (EV's) it is not limited to that particular charging application. For example, it could be used in a wide variety of other applications such as domestic, engineering, industrial, medical and military environments, in fact the invention could be used in any setting where the charging of a battery/power source is required.

BACKGROUND OF THE INVENTION

The charging of an EV vehicle, while sounding simple, is actually not just a case of plugging the vehicle into a power supply. Firstly, the vehicle and the charging point/station need to speak the same language (the charging mode, currently 4 different types). Then, there is the physical connection between the vehicle and the charging point/station (via a charging cable). The charging mode basically determines how quickly the vehicle can be charged, however when it comes to the charging cable then there are different types (the connector type). The connection type further depends on the particular vehicle manufacturer, the geographic region, the charging point/station or a home domestic electricity supply. While the popularity of EV's is growing and standardization of connector types is improving, the physical connection between an EV and the charging point/station is still a major disadvantage to owning an EV. The same applies for other fields of electronic devices. For example smart devices are known to have charging equipment which are different from manufacturer to manufacturer. Therefore, any technology that helps to overcome this problem has to be welcomed.

SUMMARY

The invention provides a plug-in module for charging of batteries in an electronic device according to claim 1, a system of claim 11, and a method of claim 12.

The plug-in module of the present invention is configured to be connected to a charging socket of an electronic device. Hence, the plug-in module allows for wireless charging the battery of the electronic device even if the electronic device itself is not configured for wireless charging. The pad-element of the plug-in module is configured to receive the electronic device either from a power supply which has a similar pad-element for transmitting the electromagnetic energy or from an second electronic device which itself has a battery and allows for charging a different electronic device by means of a pad-element which is e.g. a pad-element of a plug-in module in accordance with preferred embodiments of the invention. According to a further aspect of the invention, the invention provides a method which enables a bi-directional wireless transmission of electromagnetic energy between electronic devices. The plug-in module of the present invention can be used as an exterior structure of the electronic device. The pad-element at one end of the plug-in module, according to a preferred embodiment, can move back and forth on a rail system and so the connection point can in effect be moved toward the target when necessary. Two different charging principles can be used and are described here, namely the magnetic resonance principle and the microwave principle. The system may be controlled by/through Artificial intelligence (AI) and or a smart device application. The system may contain coils, transformers and an energy converter, efficiency being increased using conductive material. In the case of the magnetic resonance charging method the direction of the energy will be achieved by matching the interconnected parameters of the magnetic resonance coupling circuit using different configurations. In this way, energy will be transferred from the wireless pad-elements to the receivers. A smart transformer resonance balancing system may be integrated in the plug-in module, with energy being directed and transferred within certain limits. As a concept of the pad-element, transmitters may be positioned in the centre of the circular area and the receivers will be located in the outer housings. Thus, the pad-element may be placed in parallel planes. The system may be controlled by artificial intelligence and or a smart device application.

According to an embodiment of the invention, the pad-element is further configured to transmit wireless output of electromagnetic energy and the energy transmission channels and the circuit board are further configured to transfer and convert electric energy from the charging socket to the pad-element, so that the plug-in module is capable for bidirectional wireless transmission of electric energy. In this embodiment, the charging of an electronic device may be performed by using two plug-in modules according to the invention, one for the target electronic device and one for a power source. Moreover, in further embodiments, the power source may have an integrated pad-element which is configured similar to the pad-element of the plug-in module but fixedly installed in the power source and which is designed for transmitting electromagnetic energy to the pad-element of the plug-in module, which is plugged in the charging socket of the to be charged electronic device.

According to a preferred embodiment, the chassis includes a hinge configured to adjust an angle between the pad-element and the plug connector wherein an axis of the hinge is in a plane parallel to a flat transmitting surface of the pad-element. The hinge allows to adjust the pad-element parallel to a similar pad-element of a power source which transmits the electromagnetic energy for charging the electronic device. By arranging the pad-elements parallel to each other the transmission efficiency can be optimized. Further or alternatively, the plug-in module may also comprise a rail system for adjusting the distance between the plug-connector and the pad-element. According to this embodiment the distance of the pad-element with respect to a transmitter can be further adjusted in order to improve the emission efficiency.

According to a preferred embodiment, the pad-element includes an LC resonator configured to receive electromagnetic energy from a source which has an LC resonator in resonance with the LC resonator of the pad-element. In particular, with reference to the preferred embodiments which are capable for bi-directional wireless transmission of electric energy, the LC resonator of the plug-in module is also configured to transmit electromagnetic energy to a receiver which has an LC resonator in resonance with the LC resonator of the pad-element. For example, the resonance frequency may be between 100 kHz and 13.6 MHz. According to these embodiments, the transmission efficiency is very high.

According to preferred embodiments, the LC resonator includes serial or parallel resistor, inductor and capacitor circuits including at least one coil and one capacitor. Moreover, further preferable, the LC resonator comprises an electronic element with a variable impedance configured for tuning the resonance frequency of the LC resonator. According to these embodiments, the resonance frequency of the LC resonators of the transmitter (power source) and the receiver (electronic device to be charged) can be adjusted. If the resonance frequencies of the LC resonators are the same or at least very similar (for example ±20%) the transmission efficiency is very high even if the centre of the pad-elements between the transmitter and receiver are slightly misaligned, e.g. if the planes of the transmitting surfaces of the pad-element of the transmitter and the receiver are not parallel or if the centre of the pad-elements is not on a same line perpendicular to the transmitting surface of the pad-element of the transmitter or receiver.

According to an alternative embodiment, the pad-element includes an antenna array configured to receive electromagnetic energy in the spectrum of microwaves. Moreover, with reference to the embodiments which are capable for bi-directional wireless transmission of electric energy, the pad-element and the circuitry of the chassis may be configured to receive and transmit microwaves by the antenna array. Transmitting the electromagnetic energy by means of microwave energy is in particular useful it a distance between the transmitter and the receiver becomes relatively large.

Further aspects of the invention refer to a system including an electronic device having a battery and a plug-in module according to any of the embodiments described above. Moreover, an aspect of the invention also refers to a method for bi-directional transmitting electromagnetic energy. This embodiment allows charging the electronic device by means of another electronic device, e.g. energy transfer between two electronic vehicles or between two smart devices. Moreover, even bi-directional energy transfer between electronic devices of different categories is possible.

Further technical features and benefits of the present invention become clear from the following description of preferred embodiments which is given in connection with the attached drawings. The drawings show the following:

FIG. 2b shows a chassis of the plug-in module of FIG. 2a.

DESCRIPTION OF EMBODIMENTS

The following describes the technical solutions in this application in reference to the accompanying drawings, so as to assist any person skilled in the art to implement and use the present invention. Well-known structures and processes are not described thoroughly in an effort to avoid obscuring the description with redundant details.

The following embodiments describe a method and novel componentry, primarily an internal module & plug-in system, referred to as a plug-in module throughout this description, that enables a bi-directional wireless transmission of electrical energy. The concept is mainly explored within the context of charging electric vehicles, EVs, however it is not limited to that scope and could be utilized for charging devices e.g. in a domestic, engineering, industrial, medical and military environment.

As stated, a plug-in module for charging batteries of electronic devices is disclosed. It comprises a pad-element acting as receptor of wireless electromagnetic energy input, a chassis connected to the pad-element and a plug connector, wherein the chassis comprises integrated energy transmission channels and a circuit board for transfer and conversion of electromagnetic energy from the pad-element to charging current to the plug connector. The latter is configured to be plugged in the charging socket of an electronic device.

Figure 1:
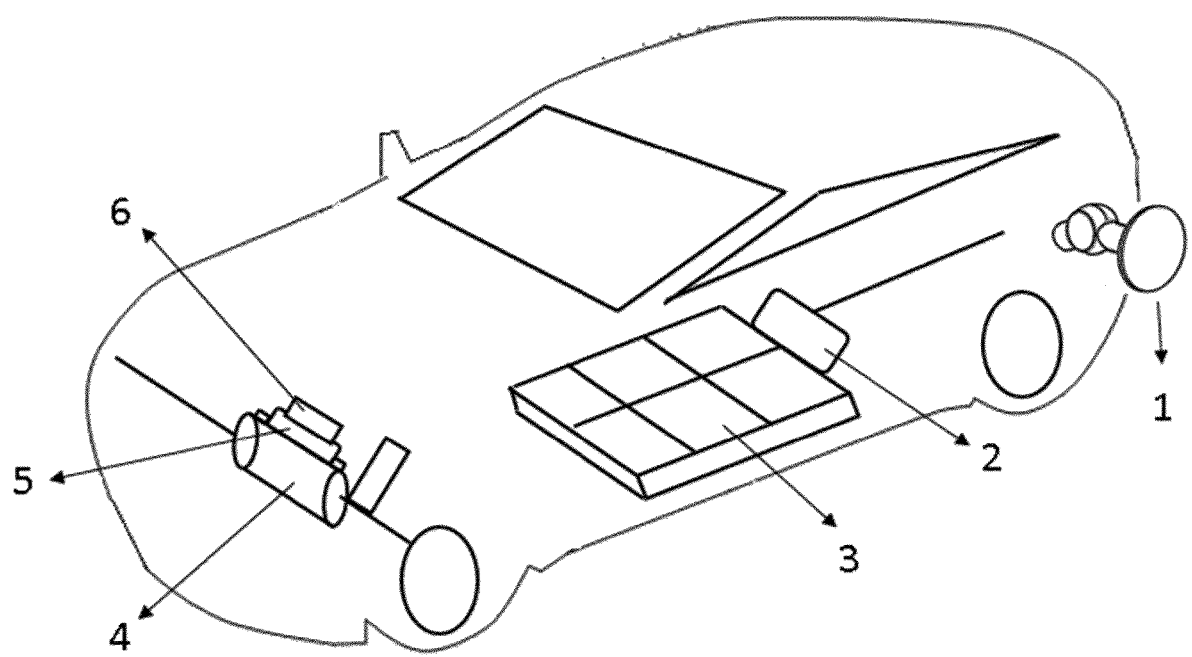
FIG. 1 shows an electronic vehicle with a plug-in module according to an embodiment of the present invention.
Figure 2A:
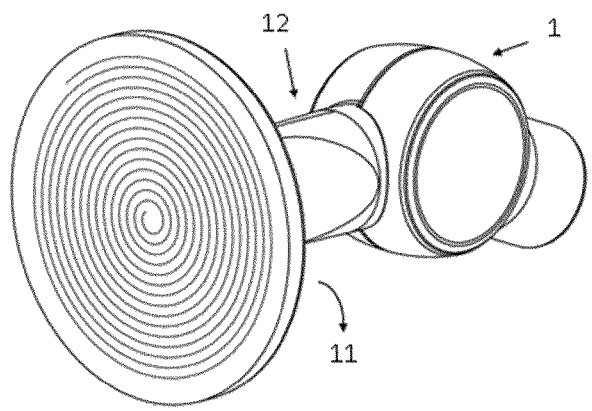
FIG. 2a shows the plug-in module according to an embodiment of the present invention.

FIG. 1 illustrates how an electric vehicle is configured to the present invention in accordance with the disclosure given here. The plug-in module 1 is depicted in a disjointed manner, indicating its three main aspects, those being the pad-element, the chassis and the plug connector. The main aspects of the EV's energy management system are presented, which comprises the following. A charger 2 enabling the charging process of the battery pack 3, which is responsible for energy storage. The electric motor 4 converting energy for electrical to mechanical, thus providing traction to the wheels, the inverter 5 responsible for power conversion from one form to another and the DC/DC converter, converting a direct current, DC, source from one voltage level to another. FIG. 2a illustrates the plug-in module 1 disclosed in FIG. 1. The prominent feature of this depiction is the pad-element 11. Within the context of the present invention this component acts as both a wireless receiver and transmitter of electromagnetic energy. The plug-in module is capable of bi-directional wireless transmission of electric energy. The energy transmission channels and circuit board are configured to also transfer and convert energy from the charging socket to the pad-element when the latter acts as a transmitter.

Figure 2B:
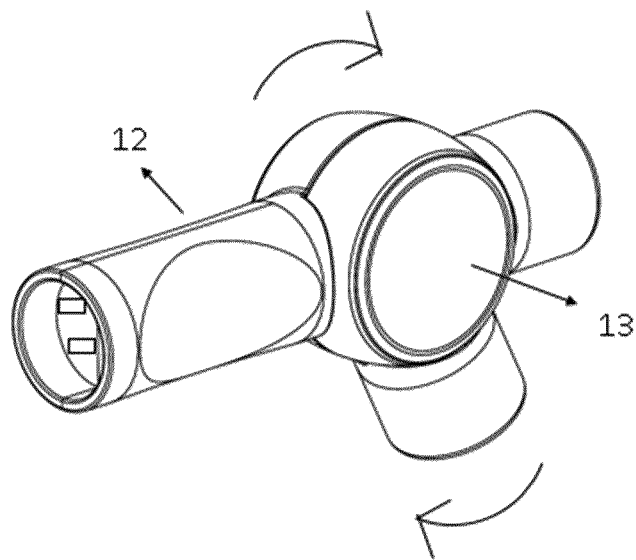

FIG. 2b illustrates the chassis 12 which is seen as being connected to the pad-element 11 in the previous figures and housing the electronic system slot. The latter serves as the main area where the electronic system will be positioned. The electronic system slot is shown to possess a rotating hinge 13 attached to the chassis 12, indicated by circular arrows implying rotational capabilities. The rotating axis is parallel to the flat surface of the pad element 11, it serves the purpose of adjusting the angle between pad-element 11 and plug connector, a component to be discussed shortly. This goal is further served by an additional feature granting the ability to move the pad element back and forth on a rail system (not shown in the figure), thus the connection point can be moved toward the target when necessary.

Figure 2C:
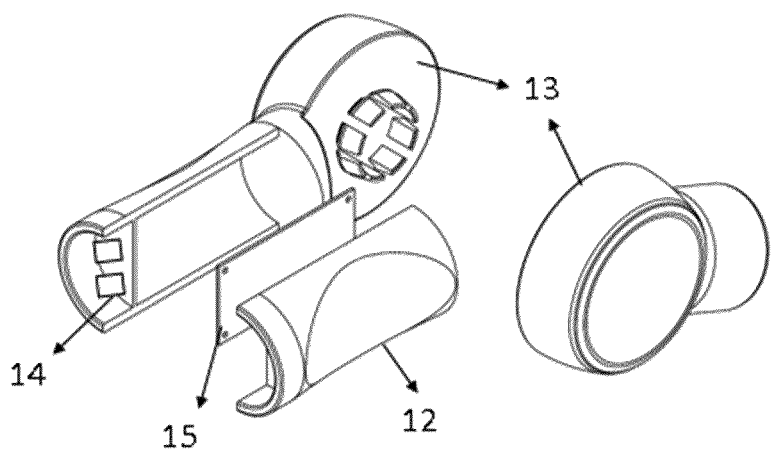
FIG. 2c shows an exploded view of the chassis of FIG. 2b.

FIG. 2c illustrates the chassis 12 of FIG. 2b in an exploded view. It is shown to also house integrated energy transmission circuits 14 and the electronic circuit board 15, those serve the roles of power amplification and conversion as stated prior.

Figure 2D:
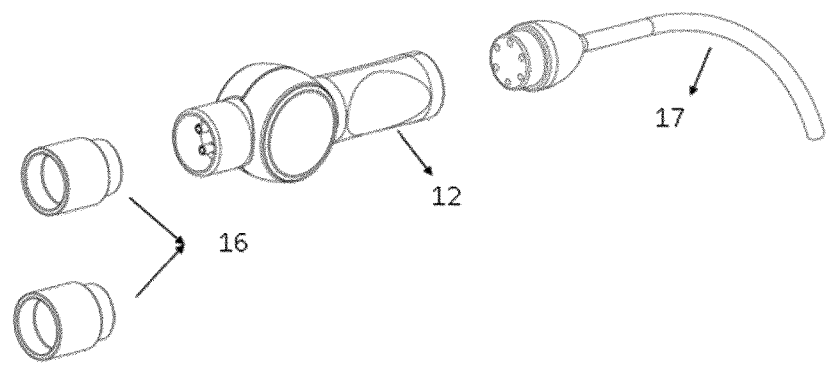
FIG. 2d shows the chassis of FIG. 2b with different front-end plug systems and a power connector.

FIG. 2d again illustrates the chassis 12 component with an optional addition of a front-end plug system, termed as plug-connector 16, used for adjusting output voltages and frequencies. Moreover, FIG. 2d shows a power connection 17. The chassis 12 is located between the plug-connector 16 and power connection 17.

Figure 3:
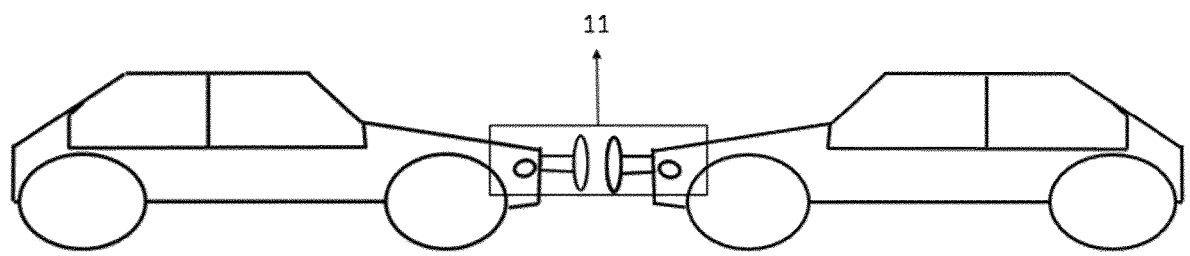
FIG. 3 shows two electronic vehicles configured for bi-directional energy transfer according to embodiments of the invention.

FIG. 3 depicts two EVs configured for bi-directional energy transfer according to the specifics of the present invention. The pad-elements 11 of each plug-in module 1 can be clearly seen as being positioned in-between the headlights of each vehicle.

Figure 4:
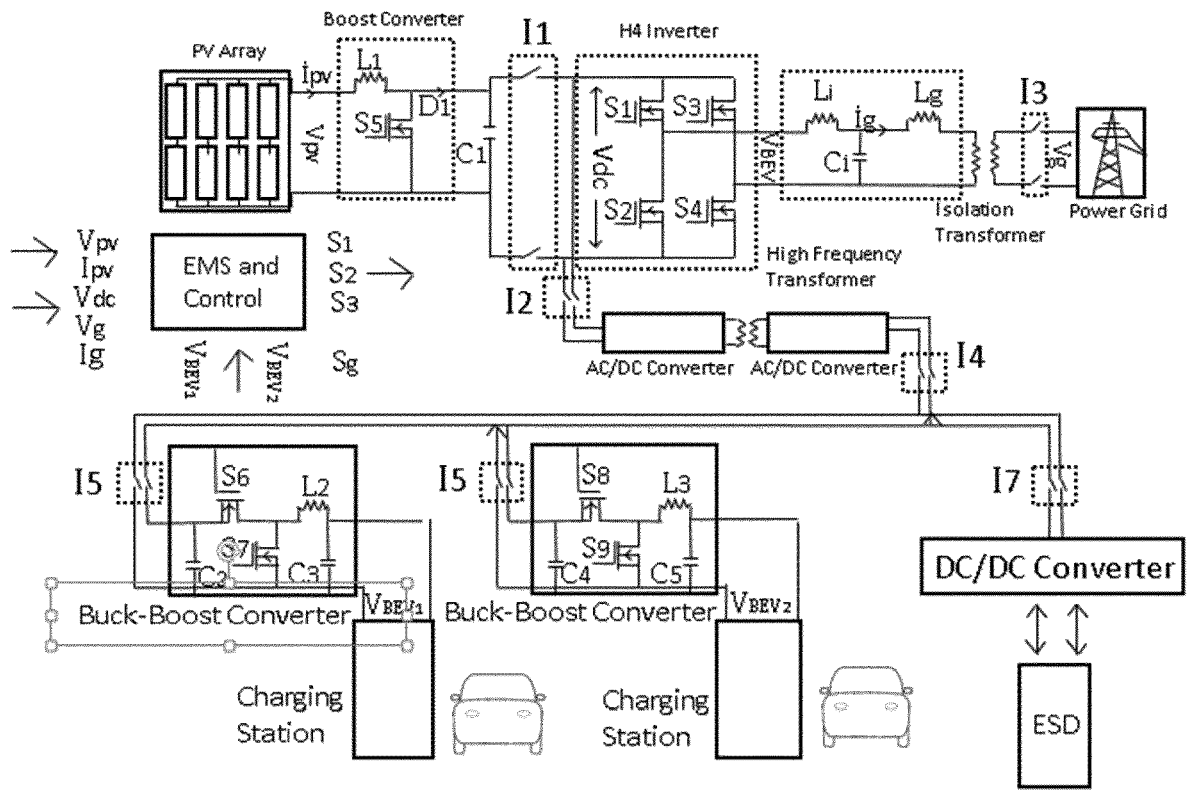
FIG. 4 shows a diagram of a charging station useful for embodiments of the present invention.

In a possible implementation, the plug-in module is designed to be an internal component of the EV. According to an alternative, the module can be equipped for use in exterior structures when the required components are installed, in that vein, FIG. 4 depicts the circuit diagram of a charging station, the purpose of its inclusion is to highlight its usefulness within the context of the present invention as the plug-in module 1 can be made to be compatible to the socket of the station. Thus, the charging of a vehicle that has an integrated plug-in module to its interior is possible by mounting a second plug-in module to the charging station.

Two different charging principles can be used and are described here, namely the Magnetic Resonance principle and the Microwave principle. The system will be controlled by/through Artificial intelligence (AI) and or a smart device application. The system will contain coils, transformers and an energy converter, efficiency being increased using conductive material. First the main components required for the implementation of each method are presented, followed by the governing principles of both cases.

In the case of the magnetic resonance charging method the direction of the energy will be achieved by matching the interconnected parameters of the magnetic resonance coupling circuit using different configurations. In this way, energy will be transferred from the wireless pads to the receivers.

In this context, a smart transformer resonance balancing system sits in the middle, with energy being directed and transferred within certain limits. As a concept of the pad element, the transmitters will be positioned in the center of the circular area and the receivers will be located in the outer housings. Thus, the transceiver will be placed on the same plane.

The aspect involving the Magnetic Resonance Charging Principle comprises the following components, power oscillators, RF (Radio-Frequency) power amplifiers (E type), transceiver antennas, bi-directional AC/DC rectifiers, voltage amplifiers, current converters, an impedance adaptation apparatus, an electronic and an electronic circuit board. More detail and the purpose of each are given below.

Power oscillators are feedback amplifiers that produce electrical vibrations in the form of the frequency and wavelength to be reached, used to adjust the frequency and wavelength from the electricity source. RF power amplifiers (E type) are used to transmit modulated waves through the air over long distances, their function is to raise and remove the input. Transceiver antennas are conductive systems that receive electrical energy and direct energy to the target source. Bi-directional AC/DC rectifiers are power electronic circuits that convert AC voltage to DC voltage.

Voltage amplifiers are used in the plug-in module to amplify small amplitude electrical signals, thereby capturing the required signal. They are a type of electronic device that converts a DC current source from one voltage level to another and increases the voltage by eliminating any irregularities that may occur. Current converters are used to control electrical energy and to convert any current form of energy into other current forms.

An impedance adaptation apparatus is used to allow the pairing of the impendences so as to work harmoniously at a certain level, even when the impendences are different. It is used to balance the resistance (impedance) against the alternating current created by the system at the coil output. The electronic circuit board is an element that consists of plates made of different insulating materials with conductive paths and islands on the surface to control electronic circuit elements. It will also include solder-coated holes between the surfaces.

For the aspect employing the microwave charging principle, the essential components and their functions are given below.

A small low capacity magnetron is used as a source of energy that creates an electric and magnetic field perpendicular to each other. This produces high frequency oscillations and power when energy is insufficient. A transistor circuit element with switching properties that is used to increase voltage and current by amplifying the signal.

A 4-diode arrangement, 2-terminal circuit element made of semiconductor materials that provides the transmission and direction of electric current over the circuit is required. The purpose of the 4 rectangular positioning in the system is to allow the flow to move in two directions. Depending on the incoming direction, then 2 diodes will turn off and allow transmission the other way. That is, it will work as a receiver and as an emitter diode.

Conductive array rectenna systems direct the energy or current from the source to the target source with electromagnetic waves. A Nickel-Titanium composite has been identified as the preferred material. A voltage regulator is used to stabilize the output voltage. A frequency stabilizer acts as a complementary element to the voltage regulator.

It is an apparatus that creates a balance state in oscillations in order to keep the frequency of the output voltage constant. An electronic circuit board with the same specifications functionalities as in the magnetic resonance scenario is also needed.

In both charging methods, the pad elements will be positioned to allow energy transfer transition in both directions. However, when energy transfer takes place in the coils (where the transition is provided), the 4 diode switches to a 2 diode and therefore the energy transfer becomes directional. This directional switching function will be provided by the Artificial Intelligence (AI) integration element of the invention.

Further insight into the two charging strategies is provided below.

One aspect follows the magnetic resonance method, in which capacitive systems with magnetic resonance are used. A voltage-increasing transformer system will be developed to direct energy, that is coming from the coils or the source, to the induction current to increase its efficiency. In order to do this, an Advanced Frequency Regulator Module is used. Resonance stabilizers are used to vacuum energy from the battery, meaning that even if energy cannot be drawn from the grid, energy can still be drawn into the field created by magnetic resonance. The Advanced Transformer Module is also used to transfer energy to another electrical field and so energy is not only fed from the source. Finally, the interaction between resources will include, unit to vehicle, vehicle to vehicle and vehicle to unit.

Figure 5:
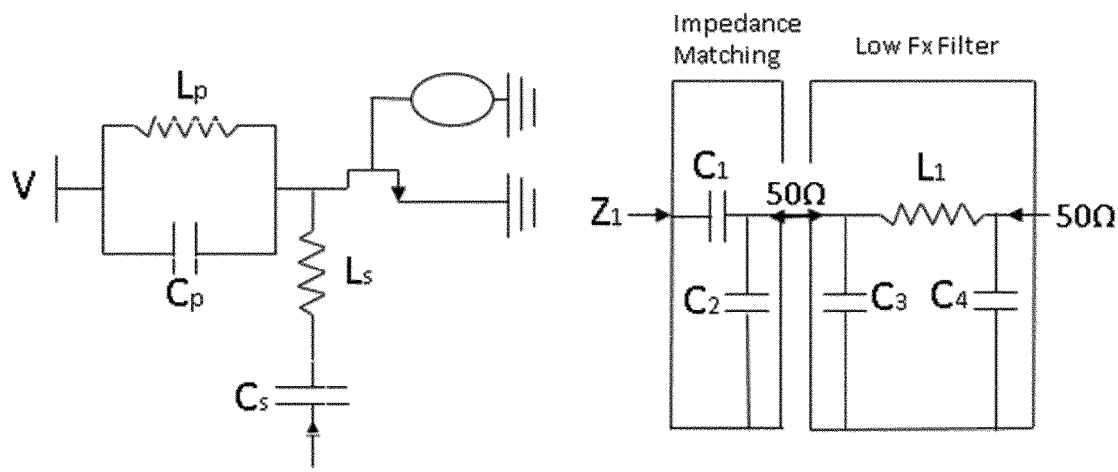
FIG. 5 shows a circuitry for an plug-in module of an embodiment of the present invention including an impedance matching.

FIG. 5 discloses the internal circuitry of the plug-in module 1 and has been designed for high-frequency circuits, this ensures an efficient operating performance and minimal losses. Impedance matching in the receiver and transmitter components will greatly increase the system's efficiency. In addition, the geometries of the printed circuit board, PCB, tracks play an important role in reducing losses; track designs that are close to right angles, as opposed to curved designs are used in the invention, this increases efficiency resulting in much better performance characteristics.

The pad-element 11 further includes an LC resonator configured to receive electromagnetic energy from a source with an LC resonator in resonance with the LC Resonator of the receiver, since the LC Resonator is configured to also transmit electromagnetic energy.

The LC Resonator includes serial or parallel resistor, inductor and capacitor (RLC) circuits that are composed of coils and capacitors, having at least one of each. These allow energy to oscillate between the electric and magnetic fields and output at the desired frequency and wave form. Also, AC/DC rectifiers, a voltage booster and a current reducer will be used for high frequency energy.

Double-sided winding structures that intersect in the middle are used for power transmission—the windings are equidistant from the center. Based on theoretical approaches, then experimental studies have shown that resonance frequencies at transmission frequencies of between 100 kHz and 13.56 MHz have resulted in;

MIT: ≥1 MHz
Qi: ~190 kHz-230 kHz
Biomed: 13.56 MHz

Figure 6:
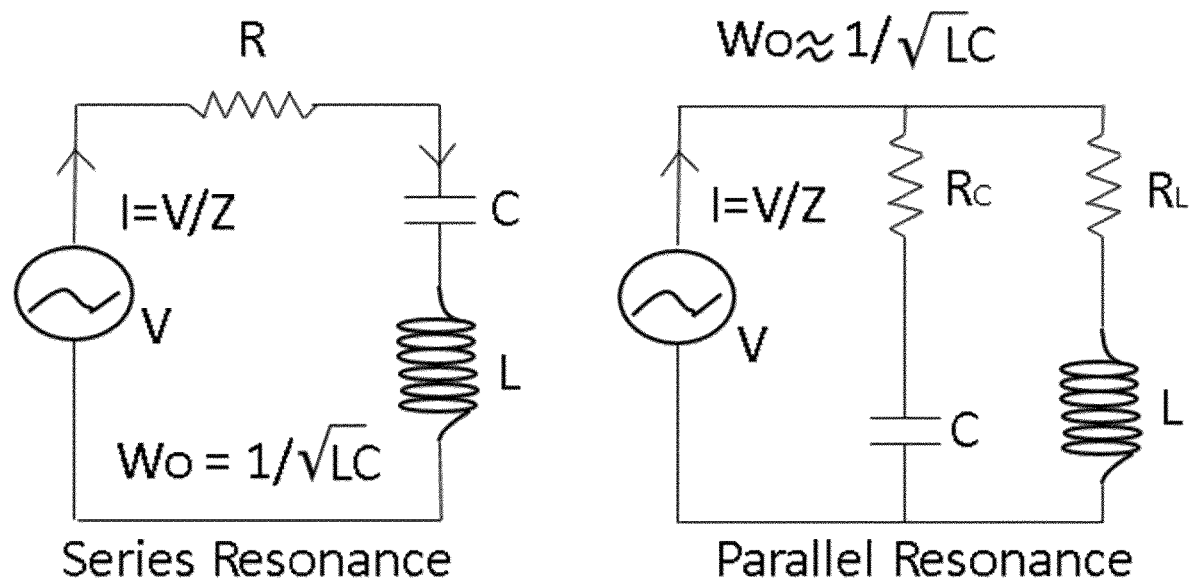
FIG. 6 shows resonance circuits which can be used in embodiments of the present invention.

FIG. 6 illustrates the circuitry of an LC resonator. Both a serial and a parallel arrangement are shown. The LC resonator may indicate an electronic element with variable impedance for tuning the resonance frequency. Their aim is to provide impedance matching between the environment and the circuit and to provide energy transmission with as little loss as is possible. In the literature, mainly ring and helix antennas or ribbon and PCB antennas are used, but it does depend on the application.

By switching at high frequency (oscillation), the variable current created on the transmitter coil creates a magnetic field. Power transmission is provided by generating current on the coil of the receiver circuit, which has the same resonance frequency with this circuit in the magnetic field (transmitter circuit). It is preferred that the resonance frequencies of the coil and capacitor pairs (in the receiver and transmitter) circuits are the same.

Figure 7:
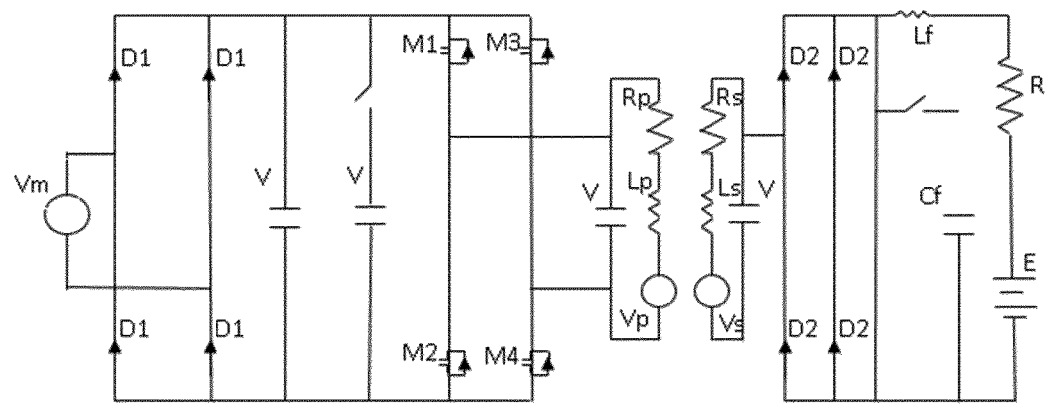
FIG. 7 shows a circuitry of a transmitter and a receiver for wireless charging in accordance with embodiments of the present invention.

FIG. 7 depicts the circuitry of a transmitter and a receiver for wireless charging within the context of the present invention according to what is stated above. Here current is passed through some discrete capacitors; this separates potentially harmful electric fields from magnetic fields. Thus, the resonant frequency of the chamber is significantly lowered so that the field enters the deep subwavelength pattern. The gap operating in the deep subwavelength regime produces magnetic fields that are stronger than the electric fields generated. As a result, the method successfully prevents the harmful effects of large electric fields without compromising the transmission power.

The main goal in wireless energy transfer is to store energy in the coil (used in the magnetic resonance circuit) and to transfer this stored energy to the other coil in the circuit.

Mains voltage is converted to high frequency alternating current to create a magnetic field induction in the emitter coil. The adjacent receiving coil is then induced from the magnetic field and generates current. In this way, energy transfer takes place between the two coils, located in the middle section of FIG. 7 at the neighboring sides of the transmitter and the receiver.

Figure 8:
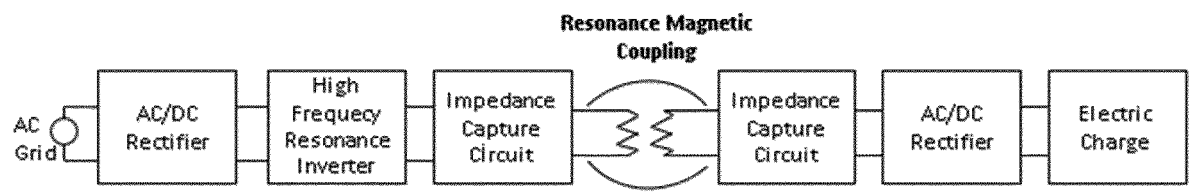
FIG. 8 shows a block diagram of a charging system according to an embodiment of the present invention based on resonance magnetic coupling.
Figure 9:
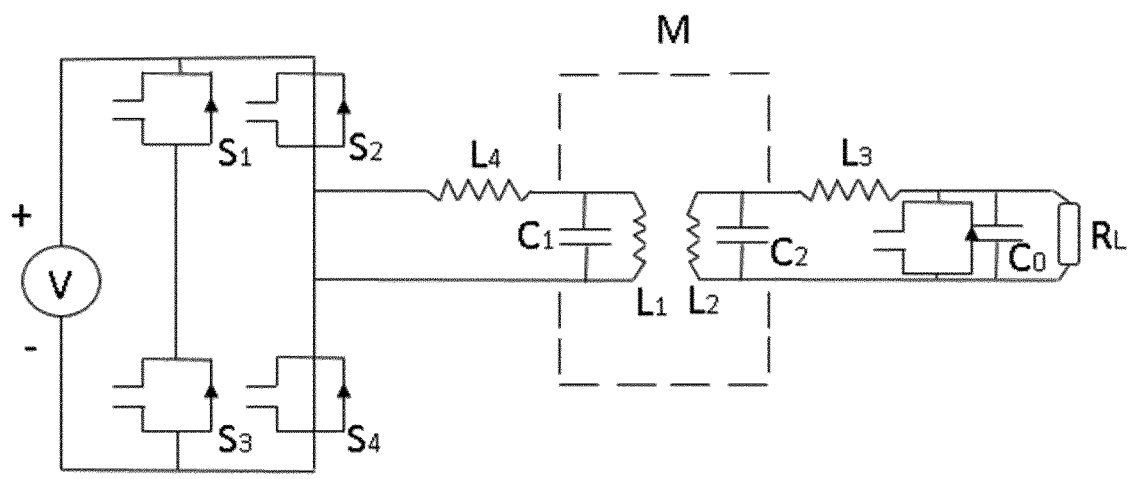
FIG. 9 shows a circuitry of a charging system using power converters for a charging system according to embodiments of the present invention.

FIG. 8 is a block diagram of a charging system according to the present invention based on magnetic resonance charging, illustrating the essential components employed in the magnetic resonance coupling. The disclosed diagram starts from the top row left and moves from left to right, thus flow is provided between a transmitter (left) and a receiver (right). A direct correlation can be made to the circuit diagrams of FIGS. 7 and 9, depicting the two parties involved in the wireless transmission of energy. Energy transfer occurs according to the specifics of the previous paragraph in the resonance magnetic coupling section of FIG. 8 found at the middle. The input power of the system is usually provided by the AC source, the AC/DC rectifier block, or by being fed DC voltage directly from the EV battery or another DC source. In high power applications, the power factor correction stage can also be included in this block. High efficiency switched converters transform the DC voltage into a RF voltage wave. This voltage wave is then used to drive the source resonator. To effectively match the output of the transducer with the source resonator—an impedance matching connection is used. This connection ensures efficient operation of the switch mode converter; however, it usually requires an inductive load impedance for the highest efficiency.

The impedance capture connection ensures that the impedance of the source resonator, the impedance of the device resonator and the output load acting on it are coupled to a suitable impedance of the source converter.

The magnetic field generated by the source resonator causes energy to accumulate within the device resonator and transmitter resonator pair. When this energy is connected to the device's resonator, it can directly power a load or be used for battery charging. Here the second impedance capture connection can be used for an efficient energy connection from the resonator to the load. It can also convert the actual load impedance to the effective load impedance which is seen by the device resonator and can then be more closely matched to the load for optimum efficiency. For loads that require DC voltage the rectifier converts the received AC power to DC power.

The purpose of the power converter on the primary side is to generate high frequency current in the primary winding, while a transducer in the secondary side is used for rectification. The square wave voltage generated by the inverter circuit is then applied to the compensation circuit. The two switches used in the rectifier on the secondary side allow the power flow to be controlled without the need for a second converter. FIG. 9 shows the circuitry of a charging system using power converters according to the above statements within the context of the present invention when the magnetic resonance charging method is used.

Regarding potential properties, a high quality mobile EV charging cable with Vehicle Connector Type 2 female and open end (the cable only has one connector) with locking option for U-lock and protective caps, 32 A, 480 V (AC).
Product Definition
   Type: C-Line
   Standards/regulations: IEC 62196-2
Charging Standard: Type 2
   Charging Mode: Mode 3, Case B
   Type of Charging Current: AC 1 or 3-phase
Ambient Conditions
   Ambient Temperature (operation): −30° C. to 50° C.
   Ambient Temperature (storage/transport): −40° C. to 8° C.
   Max. Altitude: 5000 m (above sea level)
   Degree of Protection: IP44 (plugged in)
   Degree of Protection: IP54 (Protective cap)
Electrical Properties
   Maximum Charging Power: 7.4 to 22 kW
Number of Phases: 1 or 3
   Number of Power Contacts: 3 or 5 (L1, L2, L3, N, PE)
   Rated Current of Power Contacts: 32 A
   Rated Voltage for Power Contacts: 480V AC
   Number of Signal Contacts: 2 (CP, PP)
   Rated Current for Signal Contacts: 2 A
   Rated Voltage for Signal Contacts: 30V AC
   Type of Signal Transmission: Pulse width modulation
   Resistor Coding: 220Ω (between PE and PP)
Mechanical Properties
   Insertion/withdrawal Cycles: >10,000
   Insertion Force: <100N
   Withdrawal Force: <100N
Material
   Housing Material: Plastic
Material Connection Profile: Plastic
   Material Handle Area: Soft plastic
   Material Protective Cap: Soft plastic
Material Surface of Contacts: Ag
   Cable
   Cable Structure: 3 or 5×6.0 mm$^2$+1×0.5 mm$^2$ (prEN 50620, VDE Reg. 8789 class 5)
   External Cable Diameter: 17 mm±0.4 mm
Type of Conductor: Straight
   Outer Sheath Material: TPE-U
External Sheath Color: Black
   Minimum Bending Radius: 255 mm (15×diameter)

An alternative involves the microwave charging principle. The battery and transmission medium in the EV must be a substance or material that can carry the wave—the wave medium only carrying the wave from its source to other places. It is known, that as particles in a medium become irregular and so cause an agitation and as the process continues sequentially with each particle moving to displace the adjacent particle, then the agitation/disorder progresses in an environment.

Within the context of the present invention, the magnetic field created in the plug-in module 1 will cause irregularities in the particles and this will ensure the transportation and transmission of energy by transforming them into microwaves with the transformers in the plug-in module 1.

Due to the superposition principle, every wave of the spectrum carries energy with phase velocity. In this case, the periodic pulse sequence from the microwaves is allowed to move from the generator to the receiver (the frequency spectrum of this sequence is discrete and where the spectrum consists of a series of monochrome waves). Even in the presence of normal distribution, it moves in one direction with the phase velocities of all the monochrome components.
Energy Transfer
   Level 1: 1.4 to 3.3 kWh
   Level 2: 7.2 kWh
   Level 3: 350 kWh
   Compatibility
   SAE J1772
   SAE J1772 CCS DC Combo 1 Connector Type 1
SAE CCS DC Combo 2 Connector EU Type 2
   Tesla Supercharger
Tesla Charger
   CCS
   CHAdeMO
   IEC 62196
   AC: SAE J1772, IEC 62196, Tesla Charger
   DC: CCS, CHAdeMO, TESLA Supercharger With the small magnetron being used, energy transfer will be provided when necessary. However, this system will work relatively passively for e.g. in the case of energy transfer from vehicle to vehicle. Generally, high frequency energy is supplied by a magnetron ring, the ring being formed by bending the middle conductor of a coaxial cable at frequencies below 10 GHz, and the outer conductor of the cable being soldered to the anode. The ring created in this way is then placed inside any gap. At higher frequencies, the ring is more efficient when taken away from the ring, this is to avoid an uncontrolled increase in power. When the rings move away from each other, they will not burn the circuits of the opposite source as the interaction and voltage between them will decrease relatively. Thus, the energy flow will be more stable.

The RF/DC conversion is performed by designing and characterizing an element that consists of an antenna (PCB) and a corresponding rectification circuit, commonly known as a Rectenna. Its design uses a simple and inexpensive circuit consisting of four microstrip patch antennas, some zero bias Schottky diodes, a Wilkinson power divider, and some other passive components. The circuit is manufactured from a 50 mil RO4350B substrate and copper wire. The aim is to extract energy from an RF source wirelessly with high efficiency and convert it into DC power available for charging the EV.

The four microstrip patch antennas have a 5-6 dBi gain and are used to achieve the desired power and provide efficiency in the fields. The antenna is designed to operate at a frequency of f=3.00 GHz. Various alternatives can be used for the coupler.

The microcontroller is an essential part of the radio-frequency identification, RFID, tag that sets the required DC voltage and power. In low powered RFID applications, most microcontrollers will have a DC operating voltage of between 1 and 3.5V and a current draw between 0.5 μA and 100 μA (during peak power operation). Voltage sensitivity β is the current sensitivity and its theoretical value is 20 A/W.

Figure 10:
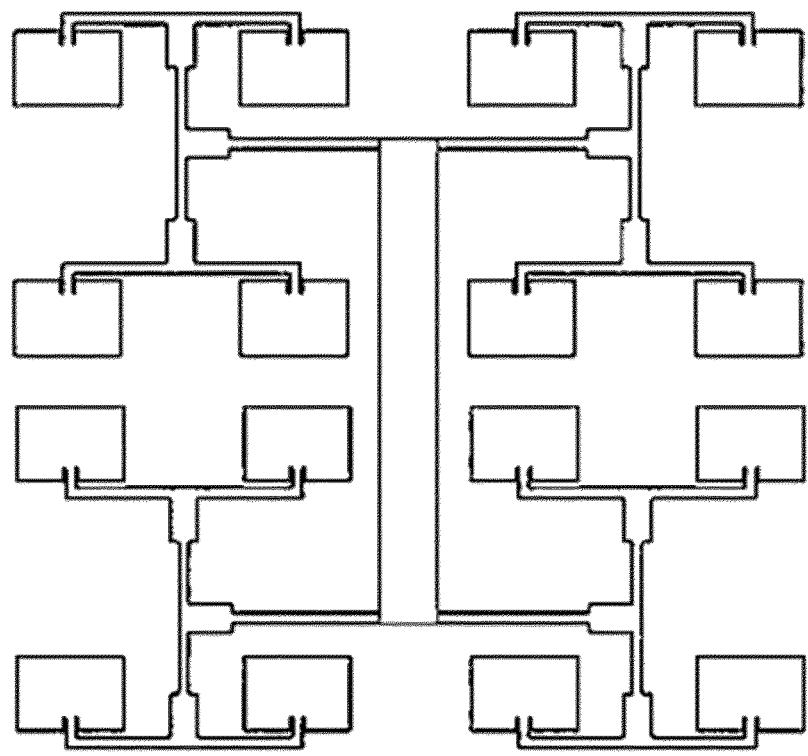
FIG. 10 shows an antenna array of a plug-in module according to an embodiment of the present invention based on microwave power transmission.

FIG. 10 illustrates an antenna array schematic, of a plug-in module 1, according to the description provided above when the present invention is used in the context of microwave power transmission. A table with the example antenna specifications is disclosed below.

| Operating Frequency | 3.00 GHz |
| --- | --- |
| Width of Single Patch (W) | 45 mm |
| Length of Single Patch (L) | 32 mm |
| Heights | 60 mils |
| Feed-line Width | 3.70 mm |
| Dielectric Constant (€r) | 3.66 |
| Distance Between Elements | 0.5λ |
| Input Impedance | 206.9 Ohm |
| Power Radiated (Watts) | 0.0007 |
| Effective angle | 0.42 sterdian |
| Copper Conductivity | 4.7 × 107(s/m) |
| E (phi) | 325.8 |
| Gain (dB) | 9.1128 |
| E (theta) | 144.2 |
| Metallization Thickness | 50 μm |
| Directivity (dB) | 10.3455 |

As mentioned prior the RF/DC conversion requires the contribution of a rectification circuit to determine its efficiency. The latter uses two different zero bias Schottky diodes. A Schottky diode is a metal-semiconductor contact between a metal and an n-doped or p-doped semiconductor. In a metal-semiconductor, free electrons flow from the semiconductor through the junction and fill the free energy states in the metal. When the applied bias exceeds the potential of the transmission, the forward current will increase rapidly as the intermediate/interface frequency, IF, and forward voltage drop, VF, increase. Diodes made of silicone or Germanium can be used.

A sample table for diode examples is disclosed below.

| Parameter | Units | HSMS-286C | HSMS-8202 |
| --- | --- | --- | --- |
| $B_V$ | V | 7 | 7.3 |
| $C_{jo}$ | pF | 0.18 | 0.18 |
| $E_G$ | eV | 0.69 | 0.69 |
| $I_{BV}$ | A | 1E−5 | 10E−5 |
| $I_S$ | A | 5E−8 | 4.6E−8 |
| N | — | 1.08 | 1.09 |
| $R_S$ | Ω | 6 | 6 |
| $P_B(V_J)$ | V | 0.65 | 0.5 |
| $P_T(X_TI)$ | — | 2 | N/A |
| M | — | 0.5 | 0.5 |

Schottky diodes can be placed in a voltage doubler system. The voltage doubler increases the power of the output compared to the power at the input and also optimizes the impedance matching network. To reduce the size of the rectifier an open circuit shunt stud can be used by removing the chip capacitor.

Figure 11:
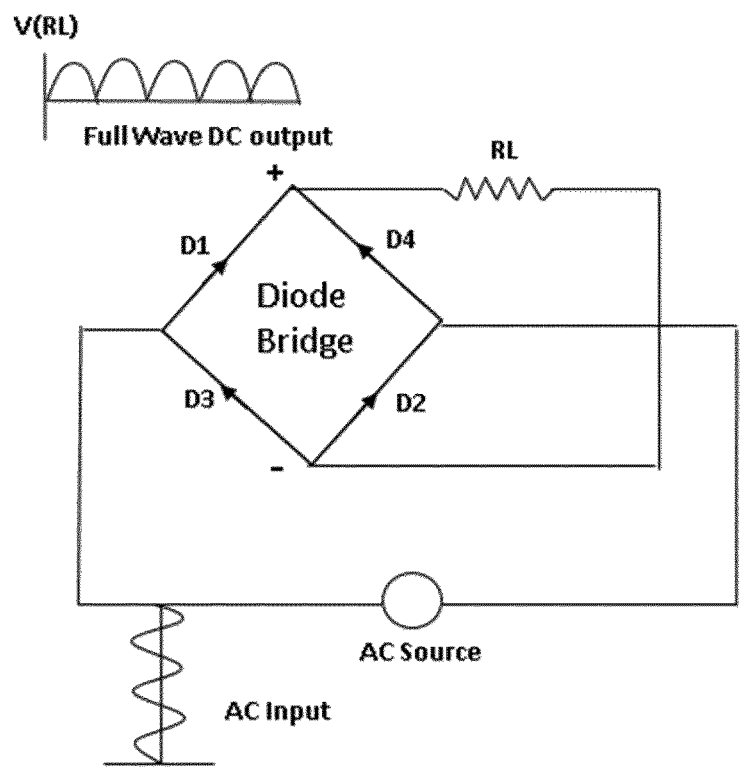
FIG. 11 shows a circuitry for a power supply useful for embodiments of the present invention.

FIG. 11 discloses the circuitry of the rectifier. In that arrangement only two out of the four depicted diodes (D1-4) allow the passage of current at any given moment. Current in the Schottky diode is carried by electrons. Usually, the diodes have a carrier life of less than loops. This extremely fast switching time makes the Schottky diode an ideal rectifier at frequencies of SoGHz and above.

$$I(V) = I_s e^{\left(\frac{V}{nV_t}\right)} - 1$$

Where $$V_t = \frac{KT}{q},$$

$$V_t = 25 \text{ mV at } T = 293K$$

$I_S$=Diode's saturation current
n=Ideality factor, takes values between 1 and 2 which depends on the material and physical structure of the diode. E.g. for a point-contact diode n=2, whereas for a Schottky barrier diode n=1.2

Diode Impedance

First the impedance for junction resistance and capacitive reactance is derived, $$Y_{d1} = \frac{1}{R_j} + j\omega C_B;$$

$$Z_{d1} = \frac{1}{Y_{d1}};$$

where $\omega = 2\pi f$

Thus the total diode impedance can be calculated as below, $$Z_{d2} = Z_{d1} + R_S; Y_{d2} = \frac{1}{Z_{d2}}$$

$$Y_{d3} = Y_{d2} + j\omega C_{pKg}; Z_{d3} = \frac{1}{Y_{d3}}$$

$$Z_{diode} = Z_{d3} + j\omega L_{pKg}$$

For higher sensitivity, we should choose diodes with a low saturation current.

A good impedance matching network should be implemented between the antenna and the input of the rectenna (rectifier circuit) to reduce reflection loss and provide a more efficient system with maximum power transfer. The equivalent impedance of the diode is predicted to be between 1.90 and 3.00 GHz.

Input power has been selected between −20 dBm and 10 dBm. By using ADS Momentum, a 3D planar electromagnetic (EM) simulator for passive circuit analysis, a good transport phenomenon between the elements will be obtained. To accommodate the diode, a short serial line segment and a series of inductors return the impedance of the diode pair to the constant sensitivity line passing through the origin around the Smith diagram, a graphical calculator or nomogram designed for electrical and electronics engineers specializing in RF engineering to assist in solving problems with transmission lines and matching circuits, used to simultaneously display multiple parameters This design uses a two-stage charge pump using Dickson's formula, but can be upgraded to multi-stage rectifiers. DC to DC converters are widely used in different applications and purposes. Buck-boost and cold converters can have realistic power efficiencies of around 90%.

The DC Pass/Output Filter, composed of a large capacitor, is another essential aspect of the present invention. It effectively shortens microwave energy and passes DC power. The distance between the diode and the output capacitor is used to resonate the capacitive reactance of the diode. Both input and output capacitors are used to store microwave energy as long as the diode is off. Finally, the capacitor separates the RF from the video sides of the circuit.

Note: The diode must provide a good RF short circuit to ensure all RF voltage appears at the diode terminals. However, it should be low in video frequencies so that it doesn't load the video circuits.

An additional set of antenna parameters is disclosed below.

| Power Raiated (Watts) | 0.0018 | |
| Efffective angle (Degrees) | 50.33 | |
| Directivity (dB) | 11.56 | |
| Gain (dB) | 10.36 | |
| Max. Intensity (Watts/Steradian) | 0.00205 | |
| Angle of U Max. (Theta, phi) | 18.00 | 90 |
| E(theta) Max(mag, phase) | 1.24 | 24.67 |
| E(phi) Max(mag, phase) | 0.001125 | 7.81 |
| E(x) Max(mag, phase) | 0.001125 | −172.2 |
| E(y) Max(mag, phase) | 1.18 | 24.67 |
| E(z) Max(mag, phase) | 0.38 | −155.333 |

Figure 12:
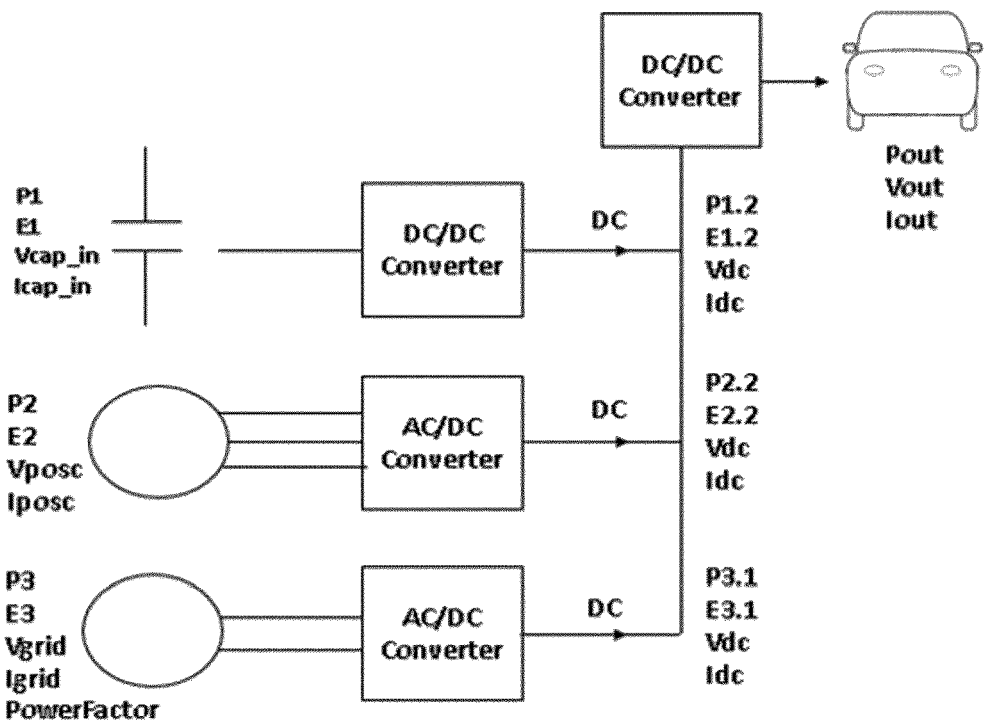
FIG. 12 shows a diagram of a charging system useful for the present invention.

FIG. 12 illustrates a charging system useful for the present invention in a simplistic way. In two of the three scenarios depicted an AC/DC converter is needed due to the nature of the power input, in one case coming directly from the electrical grid. The third scenario employs a DC/DC converter, since the input is a super-capacitor. In all cases a DC/DC converter follows, so as to adjust the voltage, leading to the battery of a plug-in electric vehicle.

The following table contains corresponding parameters and their ratings based on the considerations made so far.

| Parameter | Rating |
| --- | --- |
| Input Voltage | 230 V |
| Outpu Voltage | 12 V |
| Primary Side Rectifier: Input Voltage | 12 V |
| Output Voltage | 12 V |
| Capacitor | 1 mF |
| Boost Converter: Input Voltage | 12 V |
| Inductor | 500 µH |
| Capacitor | 200 µF |
| Switching Frequency | 25000 Hz |
| Duty Ratio | %50 |
| Output Voltage | 23 V |
| Single Phase PWM Inverter: | 0.7 |
| Carrier Frequency | 1050 Hz |
| Inductor | 30 mH |
| Capacitor | 220 µF |

Figure 13:
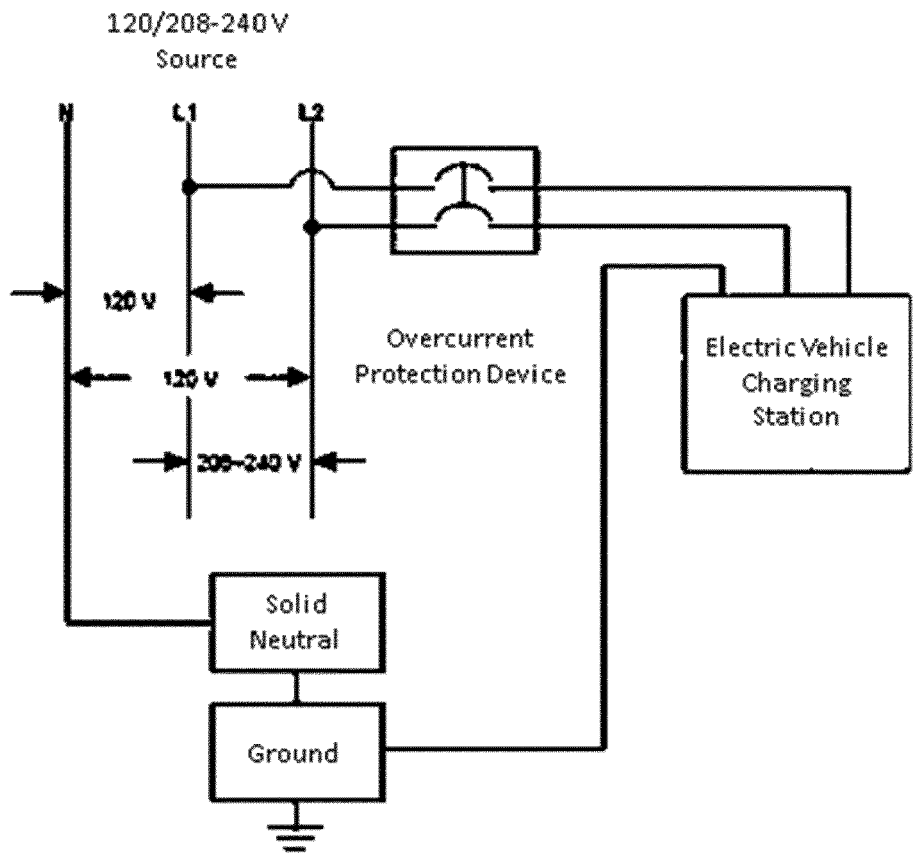
FIG. 13 shows a circuitry of a charging device useful for embodiments of the present invention.

FIG. 13 illustrates the circuitry of a standard charging outlet in the context of EVs. It is a basic schematic to be used for comparison to the here presented plug-in module 1 regarding some fundamental aspects and should not concern the reader beyond that scope.

Further possible application avenues of the present invention are given below, besides the primary development goal of wireless charging of EVs. The plug-in module could be used in any setting where the charging of a battery/power source is required, ranging from domestic to military environments among others. Some examples include;

Wireless energy transmission systems for medical products

Charging implant systems

Wireless energy transmission to patient support systems

Wireless high energy transmission in automobile and industrial systems

Dynamic and static vehicle charging systems

Industrial conditions where the use of electrical cables is problematic

Wireless electricity transmission systems in military applications

Meeting the energy needs of unmanned vehicles

Energy transfer to military portable devices

Military communication systems battery charging

The value of the plug-in module 1 within the context of pacemaker placement in a patient is discussed here. Some surgical operations are required during the replacement of pacemakers. The plug-in module 1 allows energy transfer at a very low frequency by matching the frequency and value of the energy with the capacity of the implant in the target source. In this way, it is aimed to charge the implants under the skin from a remote source. Here, in the part where the energy output is, the oscillating circuit sends the density of energy to the implant in the target source, and the energy transfer is stopped when the energy transfer is realized as much as the defined capacity. There is no need to step up or convert the energy voltage in this process. Only the principle of wireless transmission of energy is envisaged.

Figure 14:
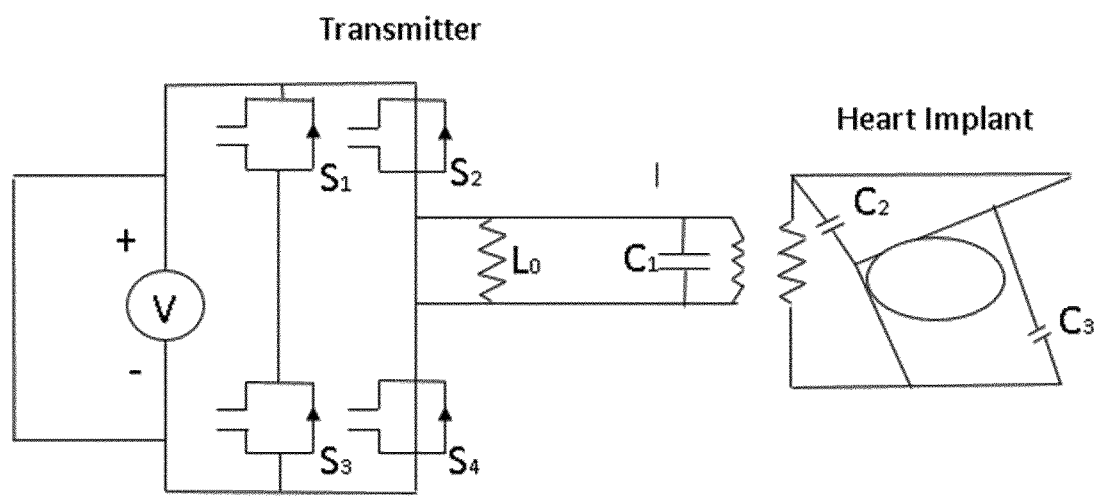
FIG. 14 shows a circuitry of a transmitter and a heart implant useful for an embodiment of the present invention.

FIG. 14 illustrates the circuitry involved in transmitting energy, thus charging, a medical implement, specifically one deployed at the heart. Both the transmitter and the implant are depicted. While the implant itself does not conform with the specifics of the plug-in module 1 already discussed, the transmitter device is an example for application of the present invention.

Harking back to the primary goal of wireless EV charging, the development of a plug connector 16 that enables energy transfer between EVs will be made. However, the scope of the present invention is intended to also include industrial devices and consumer electronics.

The plug connector 16 that enables wireless energy transfer described in this invention uses resonant circuits for wireless power transmission, this section is concerned with the specifics related to the preparation of the electronic circuit board 15 and main board for energy transfer.

At this point, openEVSE kits that are already available off-the-shelf will be used. The EVSE unit in the final product will be developed with electronic equipment that can transfer energy from vehicle to vehicle and from vehicle to unit, except for one-way transfer.

Using OpenEVSE offers many readily available, off-the-shelf parts for many of the most commonly found charging stations. Furthermore, many of these parts have already passed UL and CE tests. Hence, commercial customers will save countless development time in being able to use such parts. In addition, OpenEVSE provides opportunities for Energy Monitoring installation and control over WiFi, automation with Message Queuing Telemetry Transport (MQTT) and development with open source API, application programming interface, all of which are vital for the success of the product. Thus, the circuit will not be developed from scratch, only new functions will be introduced. Once the prototype is released, there is no obligation to adhere to openEVSE. The necessary parts can be obtained and assembled in cheaper ways.

Here the reader is provided with some context regarding the 3 different types of energy transfer that are available to owners of electric vehicles for charging. These are divided into level-by-level categories 1, 2 and 3 according to energy transfer type, capacity and charging time.

Figure 15:
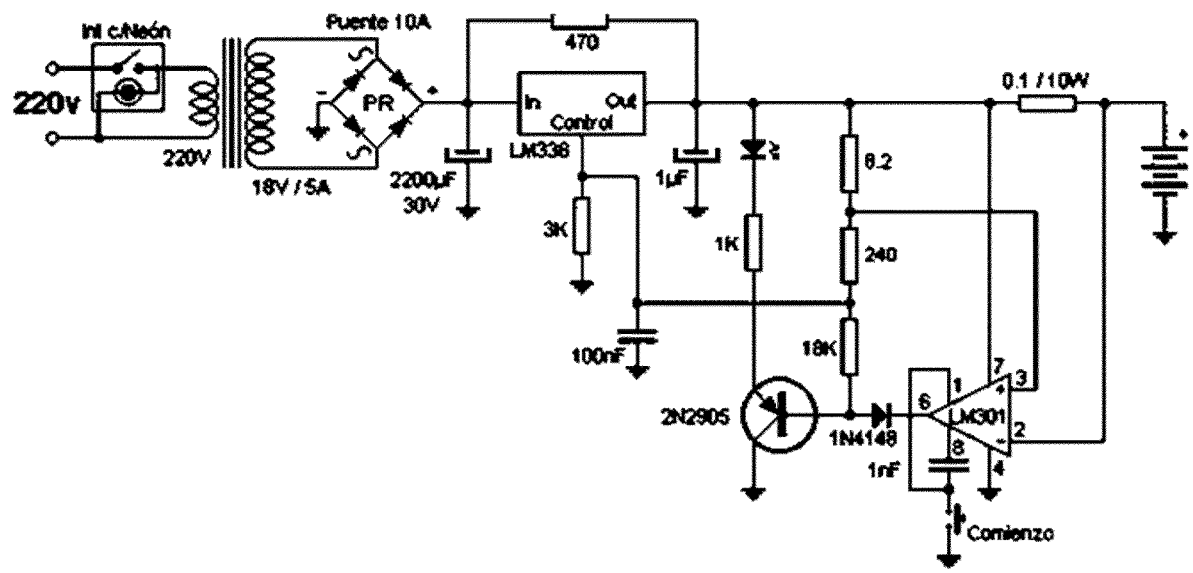
FIG. 15 shows a circuitry for charging an EV useful for embodiments of the present invention.

A Level 1 AC charging type has a 120 Volt, 20 Amp circuit and a 1.4 kW charging capacity. Depending on factors such as the type of EV, thermal efficiency, battery technology and other technical features, then using a level 1 system would take between 17 and 25 hours to charge an EV with a 100-mile range. The circuitry involved in level 1 EV charging is illustrated in FIG. 15. Only the section to the far-left is directly relevant to the purposes of this description (left of the coil interface), since that is where the present invention could be deployed to replace the disclosed circuitry.

In the case of a level 2 fast AC charging type with a 208 to 240V, 40 Amp circuit and a 6.2 to 7.6 kW charging capacity, then an EV with a 100-mile range can be charged in 4 to 5 hours. Of course this does depend on the type of EV, thermal efficiency, battery technology and other technical features.

Finally, in the case of a level 3 fast DC charge type with a typical 50 to 350 KW charging capacity, charging can take place in temperatures as low as −30° C. to as high as 50° C. without issue. With the level 3 fast DC charge system the typical charging time for an EV with a range of 100 miles is on average just 35 minutes at a 50 KW charging capacity. This does of course depend on the type of EV, thermal efficiency, battery technology and other technical features.

Figure 16:
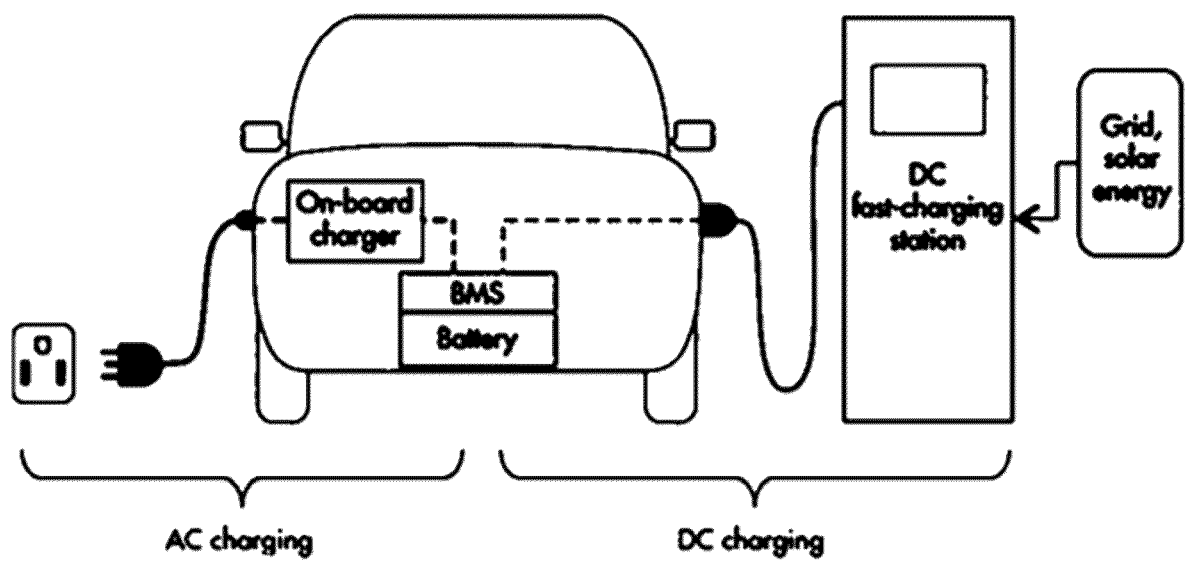
FIG. 16 shows a diagram of a charging device of an EV useful for embodiments of the present invention.

FIG. 16 compares and contrasts fundamental aspects of level 1 and level 3 charging types. The slower AC charging method is shown in the left side, wherein a cable is shown to interconnect the EV's on-board charger to the electrical grid via a suitable socket. The right side refers to the faster DC charging method. A DC fast-charging station is shown to be utilized as an intermediate step between the vehicle battery and the grid. This type of infrastructure would be shared by multiple users and would be capable of integrating renewable energy sources, e.g. solar energy, directly. In either case a Battery Management System, BSM, is part of the vehicle.

A further aspect of the plug-in module 1 of the present invention is the socket software development. The key components in the EV hardware system will "talk" to the application through a smart device, thus ensuring the correct operation of the various circuit elements.

The planning of the energy to be drawn from a vehicle to vehicle situation during the charging process will be realized through the microchips in the Electric Vehicle Hardware System and communication with the Battery Management System (BMS) of the vehicles concerned. The Arduino software will be developed from scratch; this is to avoid the use of old source code. Once the hardware is ready for use, communication between the Electric Vehicle Hardware System and the smart device will be provided by Blynk.

Furthermore, special proxy servers will be used in order to reduce the total energy used by the hardware in the EVHS during communication with their smart devices to ensure effective bandwidth. Techniques used here include optimizing packet size, eliminating unnecessary traffic, and masking wireless packet loss.

What has been discussed is a method for wireless transfer of energy between two electronic devices, each having a charging socket. The method comprising; connecting a plug-in module 1 with the above embodiments to each of the two devices. Energy transfer occurs between the pad-elements 11 of the two plug-in modules 1, thus discharging the battery of one electronic device and charging the batter of the other. The method should not be restricted to the above stated eventuality and can be deployed in any scenario involving charging the battery of an electronic device.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. Those fall within the protection scope of this application. Therefore, the protection scope of this application shall be subject to the protection scope of the claims.

REFERENCE SIGNS

1 Plug-in Module
2 Charger
3 Battery Pack
4 Electric Motor
5 Inverter
6 DC/DC Converter
11 Pad Element(s)
12 Chassis
13 Hinge
14 Integrated Energy Transmission Circuits
15 Electronic Circuit Board
16 Plug-Connector
17 Power Connection

The invention claimed is:

1. A plug-in module for charging of batteries in an electronic device, comprising:
   a pad-element configured to transmit wireless output of electromagnetic energy and receive wireless input of electromagnetic energy;
   a chassis connected to the pad-element and provided with a plug connector which is configured to be plugged in a charging socket of the electronic device wherein the chassis comprises first and second cylindrical bodies joined at a rotating hinge, the first cylindrical body housing integrated energy transmission circuits and a circuit board, and the second cylindrical body being connected to the plug connector, the integrated energy transmission circuits and the circuit board being configured to transfer and convert the electromagnetic energy from the pad-element into a charging current provided at the plug connector,
   wherein the rotating hinge attached is configured to adjust an angle between the first and second cylindrical bodies to adjust a positioning of the pad element and the plug connector.

2. The plug-in module of claim 1, wherein the integrated energy transmission circuits and the circuit board are further configured to transfer and convert electric energy from the charging socket to the pad-element, so that the plug-in module is capable for bidirectional wireless transmission of electric energy.

3. The plug-in module of claim 1, wherein a rotating axis of the hinge is in a plane parallel to a flat transmitting surface of the pad-element.

4. The plug-in module of claim 1, wherein the pad-element includes an LC resonator configured to receive electromagnetic energy from a source which has an LC resonator in resonance with the LC resonator of the pad-element.

5. The plug-in module of claim 4, wherein the LC resonator is also configured to transmit electromagnetic energy to a receiver which has an LC resonator in resonance with the LC resonator of the pad element.

6. The plug-in module of claim 4, wherein the LC resonator has a resonance frequency between 100 KHz and 13.6 MHz.

7. The plug-in module of claim 4, wherein the LC resonator includes serial or parallel resistor, inductor and capacitor circuits including at least one coil and one capacitor.

8. The plug-in module of any of claim 4, wherein the LC resonator comprises an electronic element with a variable impedance configured for tuning the resonance frequency of the LC resonator.

9. The plug-in module of claim 1, wherein the pad-element includes an antenna array configured to receive electromagnetic energy in the spectrum of microwaves.

10. The plug-in module of claim 9, wherein the pad element and the integrated energy transmission circuits in the first cylindrical body are configured to receive and transmit microwave energy by the antenna array.

11. A system of an electronic device comprising a charging socket and plug-in module of claim 1.

12. A method for transferring energy between a first electronic device and a second electronic device each having a charging socket, the method comprising:

connecting a first plug-in module of claim 1 with a charging socket of the first electronic device;

connecting a second plug-in module of claim 1 with a charging socket of the second electronic device; and starting a charging process between the first electronic device and the second electronic device by transferring energy between pad-elements of the first and second plug-in modules, thereby discharging a battery of the first electronic device and charging a battery of the second electronic device, or thereby discharging a battery of the second electronic device and charging a battery of the first electronic device.

13. The plug-in module of claim 1, further comprising a front end plug system comprising a plurality of front end plug connectors that are selectable for adjusting output voltage and frequency of the plug-in module.

* * * * *